US012727982B2

(12) United States Patent
Dai et al.

(10) Patent No.: US 12,727,982 B2
(45) Date of Patent: Sep. 8, 2026

(54) PERSONAL CARE APPLIANCE WITH LIGHT-EMITTING END COVER

(71) Applicant: SHANGHAI SHIFT ELECTRICS CO., LTD., Shanghai (CN)

(72) Inventors: Xiaoguo Dai, Shanghai (CN); Zhenwu Xu, Shanghai (CN)

(73) Assignee: SHANGHAI SHIFT ELECTRICS CO., LTD., Shanghai (CN)

( * ) Notice: Subject to any disclaimer, the term of this patent is extended or adjusted under 35 U.S.C. 154(b) by 84 days.

(21) Appl. No.: 18/702,337

(22) PCT Filed: May 22, 2023

(86) PCT No.: PCT/CN2023/095455

§ 371 (c)(1),
(2) Date: Apr. 18, 2024

(87) PCT Pub. No.: WO2023/246399

PCT Pub. Date: Dec. 28, 2023

(65) Prior Publication Data

US 2024/0415622 A1 Dec. 19, 2024

(30) Foreign Application Priority Data

Jun. 24, 2022 (CN) ......................... 202210729560.5

(51) Int. Cl.
*A61C 17/22* (2006.01)
*F21V 7/00* (2006.01)
(Continued)

(52) U.S. Cl.
CPC .......... *A61C 17/225* (2013.01); *F21V 7/0066* (2013.01); *F21V 31/005* (2013.01);
(Continued)

(58) Field of Classification Search
CPC ......... A61C 17/225; A46B 9/04; F21V 5/046; F21V 7/0066; F21Y 2107/90
See application file for complete search history.

(56) References Cited

U.S. PATENT DOCUMENTS 5,555,161 A * 9/1996 Roe ........................ G02B 6/262 362/555
6,032,608 A * 3/2000 Oreans .................. G12B 11/04 116/288
(Continued)

FOREIGN PATENT DOCUMENTS

CN 108601444 A 9/2018
CN 210447254 U 5/2020
(Continued)

OTHER PUBLICATIONS

International Search Report of PCT/CN2023/095455.

*Primary Examiner* — Zheng Song
*Assistant Examiner* — James M Endo
(74) *Attorney, Agent, or Firm* — Kilpatrick Townsend & Stockton LLP

(57) ABSTRACT

A personal care appliance having a housing and an end cover, the housing forming an opening at one end of the longitudinal axis, and the end cover having an end wall and a side wall; the end wall is substantially perpendicular to the longitudinal axis and the side wall extends out from the end wall and is inserted into the opening along the longitudinal axis direction; the personal care appliance further includes an end cover light-emitting apparatus, the end cover light-emitting apparatus including light sources, the light sources being arranged at positions inside the housing close to the end cover, and a light transmission portion, the light transmission portion including at least a part of a side wall portion and/or at least a part of a peripheral portion, and a
(Continued)

light incident portion of the light transmission portion being located at at least a part of the side wall portion.

8 Claims, 5 Drawing Sheets

(51) Int. Cl.
*F21V 31/00* (2006.01)
*F21V 33/00* (2006.01)
*F21W 131/202* (2006.01)
*F21Y 115/10* (2016.01)

(52) U.S. Cl.
CPC ..... *F21V 33/004* (2013.01); *F21W 2131/202* (2013.01); *F21Y 2115/10* (2016.08)

(56) References Cited

U.S. PATENT DOCUMENTS 8,494,337 B2 * 7/2013 Grotsch ............... G02B 6/0046 385/146
9,452,707 B1 * 9/2016 Tsai ..................... B60Q 1/0041
2003/0026106 A1 * 2/2003 Knaack .................. G02B 6/001 362/555
2012/0147617 A1 * 6/2012 Fritz ..................... B60R 1/1207 362/511
2014/0033965 A1 * 2/2014 Ookura ................ G01D 13/265 116/288
2014/0254196 A1 * 9/2014 Moriyama ........... G02B 6/0001 362/611
2014/0259474 A1 * 9/2014 Sokol ..................... A61C 17/36 15/22.2
2015/0117000 A1 * 4/2015 Luo ......................... F21V 29/70 362/335
2016/0195230 A1 * 7/2016 Grosdidier ............ F21S 41/151 362/511
2016/0195234 A1 * 7/2016 Mateju ................. A61N 1/0468 362/511
2017/0360539 A1 * 12/2017 Luo ...................... A61C 17/225
2018/0286295 A1 * 10/2018 Dubuc .................... F21V 17/12
2018/0297512 A1 * 10/2018 Nakayama ......... G02B 19/0061
2019/0151058 A1 * 5/2019 Okai .................. A46B 15/0016
2019/0394547 A1 * 12/2019 Lemons ................. H04R 1/028
2020/0192322 A1 * 6/2020 De'Longhi ............ G05B 19/10
2020/0310008 A1 * 10/2020 Kim ...................... G06F 1/1626
2020/0329859 A1 * 10/2020 Vugts ................. A46B 15/0044
2021/0172579 A1 * 6/2021 Tsuchiya ................. F21S 43/33

FOREIGN PATENT DOCUMENTS

CN 111867424 A 10/2020
CN 113543747 A 10/2021

* cited by examiner

PERSONAL CARE APPLIANCE WITH LIGHT-EMITTING END COVER

FIELD

The present disclosure relates to the field of personal care appliances, and in particular to a personal care appliance with a detachable end cover assembly, such as an electric toothbrush with a detachable end cover assembly.

BACKGROUND ART

With increasing market demand for personal care products, products are required to be more user-friendly to meet the market demand. Generally, personal care products have light indications on their housings, or light may be used to indicate working states of electric toothbrushes, such as lights having different colors are used to indicate different brushing pressures, to remind customers of the appropriate brushing pressure and so on. The light is generally provided by a light-emitting device installed in the middle of the housing.

In some applications, it is proposed to add a light indication to an end portion of a personal care product, such as a tail portion of an electric toothbrush, however, since an end cover is generally installed at the tail portion of the electric toothbrush and the tail portion further includes a sealing structure and a matching structure, there is an obstacle to arranging a light-emitting device at this position.

SUMMARY OF THE DISCLOSURE

In order to overcome the shortcomings of the prior art, the present disclosure provides a personal care appliance, which is provided with a housing and an end cover, with an opening being formed at an end portion of the housing in a longitudinal axis, the end cover having an end wall and a side wall, the end wall being substantially perpendicular to the longitudinal axis, and the side wall extending perpendicularly from the end wall and being inserted into the opening along a direction of the longitudinal axis, and the personal care appliance further includes an end cover light-emitting device, the end cover light-emitting device including: a light source arranged inside the housing close to the end cover; and a light transmission portion including at least a part of the side wall and/or at least a part of a peripheral portion, and a light incident portion of the light transmission portion is located at at least a part of the side wall, a light emission portion of the light transmission portion is located at at least a part of the peripheral portion of the side wall, and the light transmission portion is made of a light-transmissive first material.

According to an aspect of the present disclosure, a circuit board is arranged inside the housing, and the light source includes an LED light source installed on the circuit board.

In one embodiment, the light source includes a first LED light source and a second LED light source, and the first LED light source and the second LED light source are respectively installed on two opposite surfaces of the circuit board.

According to another aspect of the present disclosure, the end wall further includes a central portion surrounded by the peripheral portion, and the central portion is made of a non-light-transmissive second material, light guide surfaces are formed between the central portion and the peripheral portion of the end wall, and the light guide surfaces are inclined relative to the longitudinal axis.

According to another aspect of the present disclosure, the light incident portion further includes: an incident surface located at an end surface of the side wall and/or an incident surface located at an inner peripheral surface of the side wall, and the LED light source is arranged relative to the surface and an incident angle of light rays emitted from the LED light source on the incident surface is between 0 and 10 degrees, and the incident surface includes a spherical surface with the LED light source as the center of sphere.

According to another aspect of the present disclosure, the side wall includes reflecting surfaces for transmitting light rays to the light emission portion, and each of the reflecting surface forms an interface between an optically dense substance and an optically rarer substance, the optically dense substance is the first material forming the light transmission portion, and the reflecting surface is configured relative to the light rays from the light source and an incident angle of the light rays emitted by the light source relative to the reflecting surface is greater than a total reflection angle of the reflecting surface. In one embodiment, a gap is formed between the reflecting surface and an inner surface of a segment of the housing surrounding the reflecting surface, and the optically rarer substance includes air filled in the gap.

According to another aspect of the present disclosure, the side wall includes reflecting surfaces for transmitting light rays to the light emission portion, and at least a part of each of the reflecting surfaces is covered with a non-light-transmissive material, and an angle of the reflecting surface relative to incident light rays is set to reflect the light source toward the light emission portion.

According to another aspect of the present disclosure, the peripheral portion of the end cover is inserted into the opening and surrounded by the housing, and the housing includes a light-transmissive portion surrounding the peripheral portion.

According to another aspect of the present disclosure, the end cover is integrally formed of the first material, and the personal care appliance further includes a coil bobbin located in the housing and adjacent to the end wall, and a flange of the coil bobbin adjacent to the end wall includes a reflecting surface.

In one embodiment, the personal care appliance of the present disclosure is an electric toothbrush, a groove is formed in an outer surface of the side wall of the end cover, and a sealing ring is accommodated in the groove.

According to the light-emitting device of the present disclosure, an annular light-emitting assembly may be formed at a tail end of a handle of an electric toothbrush, and the structure of the end cover can allow the light rays to avoid the sealing ring made of rubber having no or weak light-transmissive ability and lead the light rays out from an end portion of a circuit board, to provide a novel way of light indication. In addition, the structure of the light-emitting device would not increase the installation complexity of the handle and the water tightness.

BRIEF DESCRIPTION OF THE DRAWINGS

The present disclosure will be further described based on the exemplary embodiments shown in the drawings. The exemplary embodiments are given by way of non-limiting illustration. It should be noted that the drawings are only schematic representations of the embodiments of the present disclosure given by way of non-limiting examples.

REFERENCE SIGNS

Figure 1:
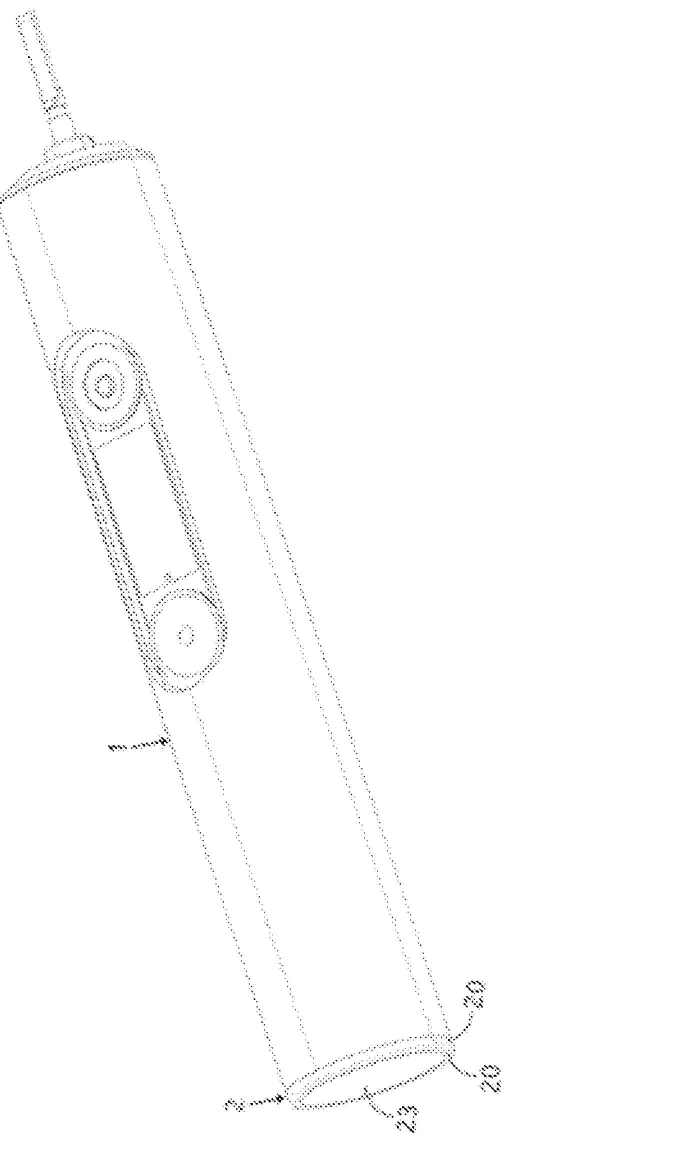
FIG. 1 shows a perspective view of a handle of an electric toothbrush according to one embodiment of the present disclosure.

1 handle
11 housing
11' housing
12' light-transmissive portion
11" housing
12" light-transmissive portion
13 gap
14 gap
15 opening
2 end cover
20 peripheral portion
21 first portion
21' first portion
22 light guide surface
23 central portion
23' central portion
24 light guide surface
25 groove for sealing ring
26 first incident surface
27 first reflecting surface
28 second incident surface
29 second reflecting surface
30 auxiliary reflecting surface
3 rack
4 circuit board
41 first LED
42 second LED
43 third LED
44 fourth LED
5 charging coil bobbin
5" charging coil bobbin
51" light guide surface
6 sealing ring
$L_{01}$ main optical axis of first LED
$L_{02}$ normal line of first reflecting surface
$L_{03}$ normal line of auxiliary reflecting surface
$L_{04}$ normal line of light guide surface
$L_{10}$, $L_{11}$, $L_{12}$ first part of light of first LED
$L_{20}$, $L_{21}$, $L_{22}$ second part of light of first LED
$L_{30}$, $L_{31}$, $L_{32}$ third part of light of first LED
$L_{41}$, $L_{42}$ fourth part of light of first LED
$L_{05}$ main optical axis of fourth LED
$L_{06}$ normal line of second reflecting surface
$L_{07}$ normal line of light guide surface
$L_{13}$, $L_{14}$, $L_{15}$, $L_{16}$ first part of light of fourth LED
$L_{23}$, $L_{24}$, $L_{25}$, $L_{26}$ second part of light of fourth LED
$L_{33}$, $L_{34}$, $L_{35}$ third part of light of fourth LED
$L_S$ longitudinal axis
$\alpha$ included angle between $L_{04}$ and $L_S$

DETAILED DESCRIPTION OF EMBODIMENTS

Personal care appliances with detachable end cover assemblies according to the embodiments of the present disclosure will be described below with reference to the drawings. In the following text, the personal care appliances are described by taking electric toothbrushes as examples, but it should be understood that the personal care appliances may also be oral irrigators, electric shavers, and other personal care appliances having the requirements of waterproofing.

Figure 4:
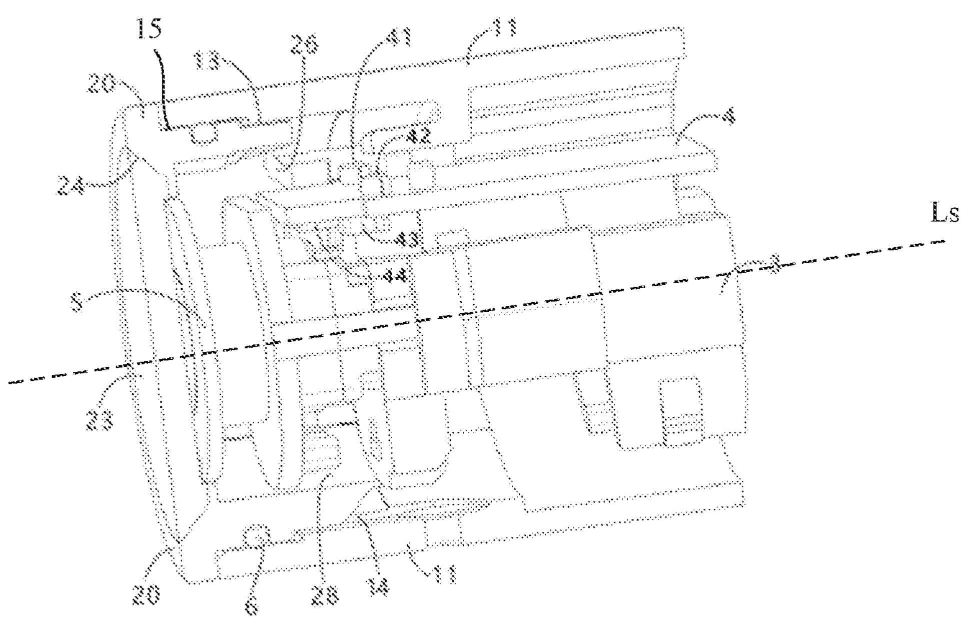
FIG. 4 shows a cross-sectional perspective view of an end portion of the electric toothbrush according to one embodiment of the present disclosure.

FIG. 1 shows a perspective view of a handle 1 of an electric toothbrush according to one embodiment of the present disclosure. The handle 1 of the electric toothbrush mainly includes a housing 11 and an end cover 2. The housing 11 has a generally cylindrical outer contour, and a hollow space is formed inside the housing 11. As shown in FIG. 4, the cylindrical outer contour of the housing 11 has a longitudinal axis $L_S$, and a rack 3 and a circuit board 4 are arranged in the hollow space formed by the housing 11. An open opening 15 is provided at an axial end portion of the housing 11. The end cover 2 is adapted to be fitted into the opening 15. The electric toothbrush is further provided with a charging coil bobbin 5 for charging, which is close to the inside of the end cover 2.

Figure 2:
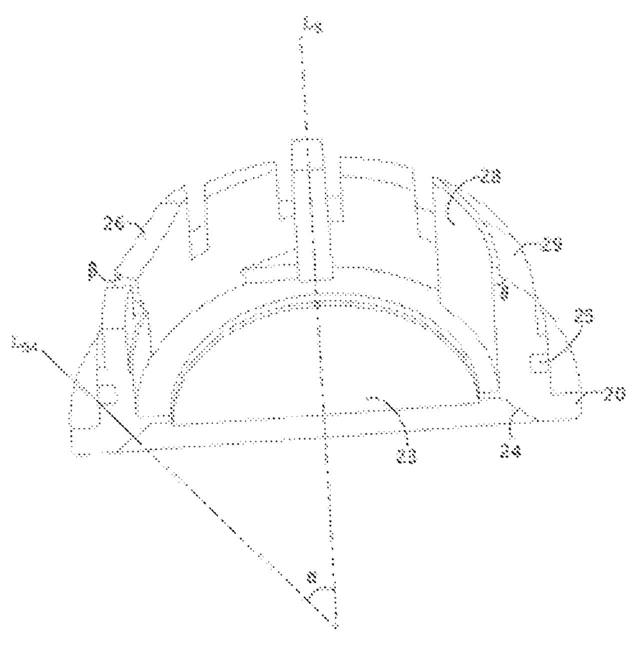
FIG. 2 shows a cross-sectional perspective view of an end cover fitted on the handle shown in FIG. 1.
Figure 3:
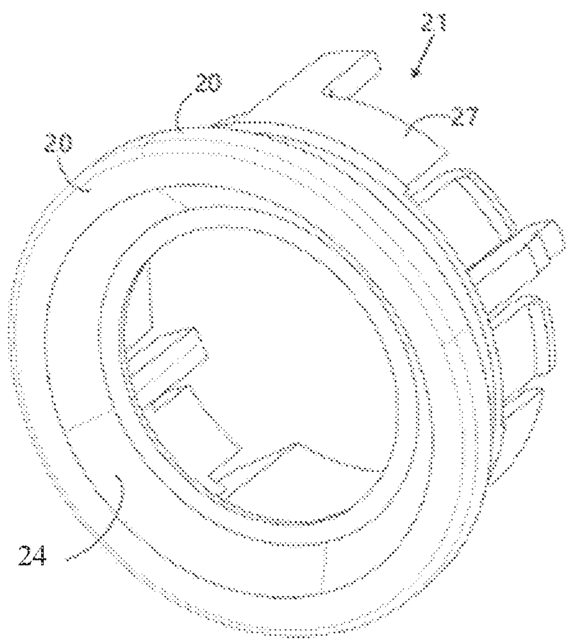
FIG. 3 shows a perspective view of a light transmission portion of the end cover according to one embodiment of the present disclosure.

As shown in FIGS. 2-4, the end cover 2 fitted in the opening 15 mainly includes an end wall and a side wall. The end wall extends substantially perpendicular to the longitudinal axis $L_S$, and is sized and shaped to match the opening 15 of the housing 11. In one embodiment, the end wall of the end cover 2 is circular when viewed in a direction perpendicular to the longitudinal axis $L_S$. The side wall of the end cover 2 extends substantially perpendicularly from the end wall and is inserted into the opening 15 along a direction of the longitudinal axis $L_S$. The side wall is recessed radially inward relative to an outer peripheral surface of the end wall by a short distance, which is substantially equal to a wall thickness of the housing 11. In this way, a flange protruding radially outward relative to the side wall is formed on the end wall, and the flange constitutes at least a part of a peripheral portion 20 of the end cover 2.

In order to ensure the waterproof requirements of the electric toothbrush, a waterproof seal is formed between the end cover 2 and the open opening 15 formed at one end of the housing 11. Generally, a sealing ring 6 is arranged between the end cover 2 and the housing 11, and the sealing ring 6 is embedded in a groove 25 formed in the side wall of the end cover 2, to prevent fluid and other pollutants from entering the housing 11 through the opening 15. In addition, the end cover 2 and the housing 11 may be provided with engagement devices to achieve a fixed connection between the end cover 2 and the housing 11.

The electric toothbrush according to the embodiments of the present disclosure is provided with an end cover light-emitting device on a side of the handle 1 where the end cover 2 is located. The end cover light-emitting device according to the present disclosure mainly includes a light source and a light transmission portion, and light rays emitted by the light source are transmitted through the light transmission portion to finally provide an annular light indication around the end portion of the handle 1.

In one embodiment, as shown in FIG. 4, the circuit board 4 is arranged in the hollow space of the housing 11, and a first LED 41, a second LED 42, a third LED 43 and a fourth LED 44 are arranged at a tail portion of the circuit board 4 close to the rear cover 2. These LEDs 41, 41, 42, 43 and 44 constitute the light source of the end cover light-emitting device. The first LED 41 and the second LED 42 are installed on one side of the circuit board 4, while the third LED 43 and the fourth LED 44 are installed on the other side of the circuit board 4. It should be understood that in other embodiments, the light source may also include fewer or more light sources. In one embodiment, the light source includes at least two LEDs, with at least one LED being installed on each side of the circuit board 41. The LED light sources may have the same color or different colors.

FIG. 3 shows the shape of a part of the end cover 2 according to one embodiment, the part including the light transmission portion and being made of a light-transmissive material. The light transmission portion includes at least a part of the side wall and the peripheral portion 20 of the end cover 2, and a light incident portion of the light transmission portion is located at an end surface or an inner side surface of the side wall. A light emission portion of the light transmission portion is located at the peripheral portion 20 of the side wall, and may include an outer peripheral surface of the peripheral portion 20 parallel to the longitudinal axis and an end surface perpendicular to the longitudinal axis.

Figure 5:
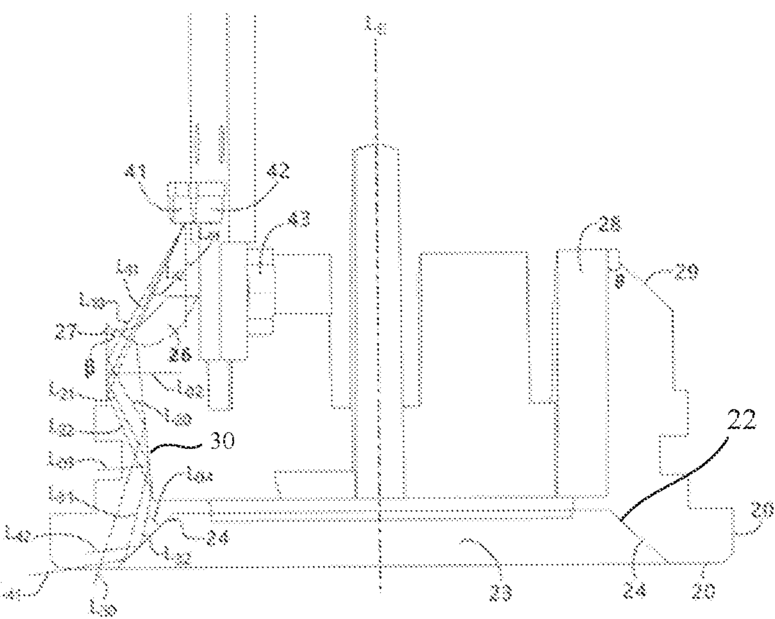
FIG. 5 shows a schematic diagram of an internal structure of the end portion of the electric toothbrush according to one embodiment of the present disclosure, which is taken along a longitudinal axis, showing a local optical path of light rays in the end cover that are emitted by a first LED.
Figure 8:
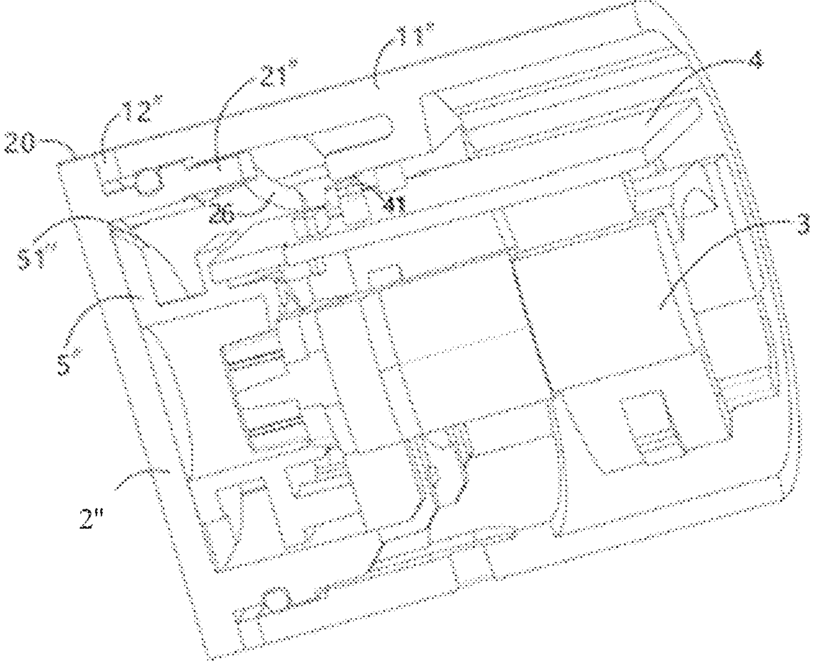
FIG. 8 shows a schematic diagram of an internal structure of an end portion of an electric toothbrush according to one embodiment of the present disclosure, which is taken along a longitudinal axis.

As shown in FIGS. 5 and 8, in the first embodiment, the light incident portion includes a first incident surface 26 and a second incident surface 28, and the incident surfaces 26 and 28 at two positions respectively correspond to two groups of LEDs on two opposite sides of the circuit board 4.

As shown in FIG. 5, the first incident surface 26 is located at the end surface of the side wall of the end cover 2 to mainly receive light rays from the first LED 41 on one side of the circuit board 4. The first reflecting surface 26 is generally located below a side of the first LED 41, and a main optical axis $L_{01}$ of the first LED 41 points toward the end wall of the end cover 2. In particular, at least a part of the first incident surface 26 is formed as a part of a spherical surface with the first LED 41 as a center of sphere, to enable at least some of the light rays from the first LED 41 to be perpendicularly incident on the first incident surface 26. Similarly, with regard to the second LED 42 on this side of the circuit board 4, a further corresponding incident surface is, in one embodiment, provided on the end surface of the side wall.

Figure 6:
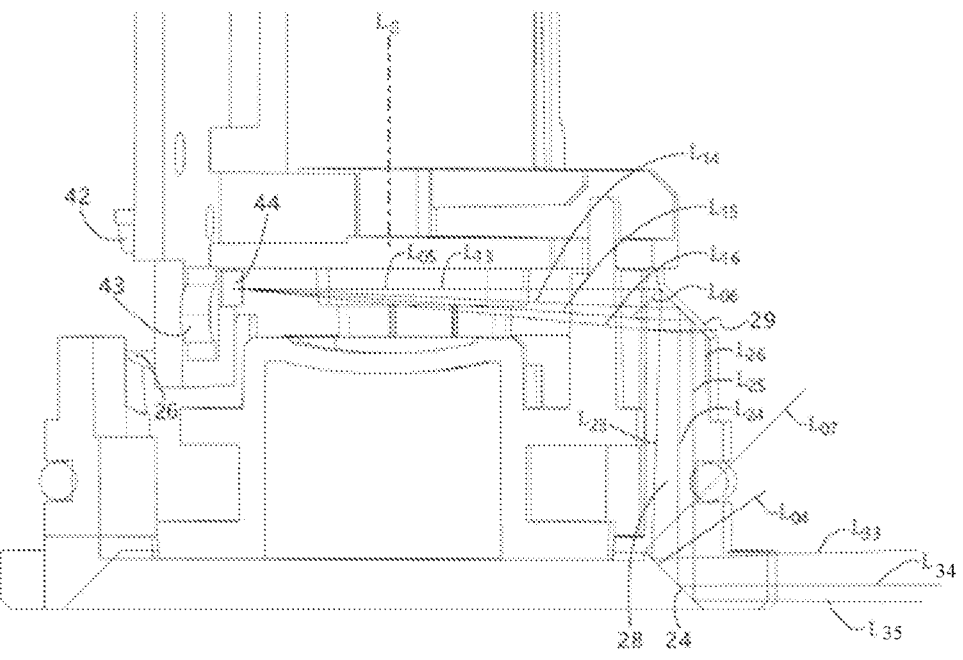
FIG. 6 shows a schematic diagram of the internal structure of the end portion of the electric toothbrush according to one embodiment of the present disclosure, which is taken along the longitudinal axis, showing a local optical path of light rays in a rear cover that are emitted by a fourth LED.

As shown in FIG. 6, the second incident surface 28 is arranged on the inner side surface of the side wall of the end cover 2 to mainly receive light rays from the fourth LED 44 on the other side of the circuit board 4. In particular, at least a part of the second incident surface 28 is formed as a part of a spherical surface with the fourth LED 44 as a center of sphere, to enable at least some of the light rays from the fourth LED 44 to be perpendicularly incident on the second incident surface 28. The light rays emitted from the fourth LED 44 will reach the second incident surface 28 through an open space between the charging coil bobbin 5 and the rack 3 which are accommodated in the housing 11. Similarly, with regard to the third LED 43 on this side of the circuit board 4, a further corresponding incident surface is, in one embodiment, provided on an inner side wall of the side wall.

Each of the first incident surface 26 and the second incident surface 28 is an interface between an optically dense substance and an optically rarer substance. In one embodiment, the material of the light transmission portion of the end cover 2 is an optically dense substance relative to air, while the air surrounding the light transmission portion of the end cover 2 is an optically rarer substance.

As can be seen from FIG. 4, in the direction of the longitudinal axis $L_S$ of the housing 11, the first incident portion 26 and the second incident surface 28 are located on a side of the O-ring 6 away from the end wall of the end cover 2 that forms the light emission portion, the LED light sources are also located on the side of the O-ring 6 away from the end cover 2, the first incident portion 26 is located below an outer radial side of the first LED 41, and the main optical axis $L_{01}$ of the first LED 41 is arranged to point toward a second portion 23 of the rear cover.

In order to avoid the impact of the generally opaque O-ring 6 embedded in the side wall on the transmission of light rays, and also to allow the light rays to radially leave the light emission portion of the peripheral portion 20, light guide surfaces 22, 24 and reflecting surfaces 27, 29 are further provided on the side wall which serves as the light transmission portion.

In one embodiment, the end wall of the end cover 2 is divided into two portions: a central portion 23 of the end wall and the peripheral portion 20 of the end wall. In this way, a light guide surface 22 of the peripheral portion 20 and a light guide surface 24 of the central portion 23 are formed in the end wall of the end cover 2, and the two portions 20 and 23 are integrated by means of the light guide surfaces 22 and 24. Since the central portion 23 is a non-light-transmissive or weak light-transmissive body, it is not required that the central portion 23 is an optically rarer substance relative to the peripheral portion 20.

As shown in FIG. 5, the light guide surfaces 22, 24 are located adjacent to the side wall of the end cover 2, and are arranged obliquely relative to the longitudinal axis $L_S$, and the light guide surfaces each taper in an upward direction of the longitudinal axis $L_S$ as shown in FIG. 5, forming a truncated cone. In one embodiment, as shown in FIG. 5, a normal line $L_{04}$ of the light guide surface 24 points radially outward and upward toward the housing 11, and an included angle $\alpha$ between the normal line $L_{04}$ and the longitudinal axis $L_S$ is greater than 0 degrees and less than 90 degrees. In this embodiment, the included angle $\alpha$ for the light guide surface 24 is set and the light guide surface can receive light rays reflected at least once in the light transmission portion.

The light transmission portion further includes a first reflecting surface 27 and a second reflecting surface 29 corresponding to the first incident surface 26 and the second incident surface 28, respectively.

In one embodiment, as shown in FIG. 5, with regard to the first incident surface 26, the side wall of the end cover 2 includes the first reflecting surface 27 corresponding to the first incident surface 26, the first reflecting surface 27 is arranged on an outer side surface of the side wall, and an included angle $\beta$ is formed between the first incident surface 26 and the first reflecting surface 27. The first reflecting surface 28 allows the light rays entering from the first incident surface 26 to be reflected radially inward and downward toward the inner side surface of the side wall while avoiding the groove for the O-ring. Further, with regard to the first reflecting surface 27, an inner surface of the side wall at this place further constitutes an auxiliary reflecting surface 30 to assist in reflecting light rays to the light guide surfaces 22, 24 below. It should be understood that this auxiliary reflecting surface 30 may be omitted if the light rays reflected by the first reflecting surface 28 can reach the light guide surfaces 22, 24.

As shown in FIG. 6, with regard to the second incident surface 28, the side wall of the end cover 2 includes a second reflecting surface 29, the second reflecting surface 29 is arranged on an outer radial side of the second incident surface 28 of the end cover, and an included angle θ is formed between the second incident surface 28 and the second reflecting surface 29. The included angle θ is set to enable light rays to be reflected to the light guide surfaces 22, 24 while avoiding the sealing ring 6 on the side wall.

In the first embodiment shown in FIG. 4, each of the LEDs constitutes a point light source. Conventionally, light rays emitted by the LED are distributed in a cone with the center of the LED as an apex and with an apex angle of 120 degrees, that is, the light rays of the LED form a cone with an apex angle of 120 degrees, and the closer to the center of the cone, the greater the intensity of light rays. A central axis of the cone is the main optical axis of the LED, for example, $L_{01}$ in FIG. 5 is the main optical axis of the first LED 41, and $L_{05}$ in FIG. 6 is the main optical axis of the fourth LED 44.

According to the principle of reflection and refraction of visible light, when light rays enter from one light-transmissive substance into another light-transmissive substance, the smaller an incident angle of incident light rays on an interface between the two substances, the less the energy of reflected light rays, while the greater the energy of refracted light rays entering another substance. When the incident angle is 0 degrees, the energy of refracted light rays or incident light rays is the largest. In addition, where the light rays enter from one light-transmissive optically dense substance into another light-transmissive optically rarer substance, when an incident angle of the light rays on the interface between the two substances is greater than a total reflection angle, the energy of reflected light rays is the largest, and the light cannot be refracted into the optically rarer substance, that is, the light rays can only be reflected in the optically dense substance. If the total reflection angle is C, and the refractive index of the optically dense substance is n, then sin (C)=1/n. The refractive index of the optically dense substance is greater than that of the optically rarer substance. For example, the refractive index of MABS (transparent ABS) is about 1.542, so the total reflection angle of MABS is 40.43 degrees. Where light rays are emitted toward air from an MABS material, when the incident angle of light rays on the MABS material is greater than or equal to 40.43 degrees, the light rays are only totally reflected in the MABS, and no light rays are emitted into the air from the MABS.

In the first embodiment, the first reflecting surface 27 and the second reflecting surface 29 are each particularly configured as an interface between an optically dense substance and an optically rarer substance. The first reflecting surface 27 and the second reflecting surface 29 are spaced apart from the adjacent housing 11 by a gap 13 and a gap 14, the gap 13 and the gap 14 are both filled with air, and thus the first reflecting surface 27 and the second reflecting surface 29 each form an interface between a material of the side wall and air. The material of the side wall is an optically dense substance, while the air is an optically rarer substance.

First, a light transmission path shown in FIG. 5 is described, which takes the first incident surface 26 as an entrance.

The first LED 41 installed on one side of the circuit board 4 emits a first part of light $L_{10}$, $L_{11}$, $L_{12}$ of the first LED, and an included angle between the first part of light $L_{10}$, $L_{11}$, $L_{12}$ of the first LED and the main optical axis $L_{01}$ of the first LED is less than 60 degrees and greater than 0 degrees. In one embodiment, the included angle between the first part of light $L_{10}$, $L_{11}$, $L_{12}$ of the first LED and the main optical axis $L_{01}$ of the first LED is less than 45 degrees and greater than 0 degrees. The advantage of such an arrangement is that the closer the light rays of the LED is to the main optical axis $L_{01}$ of the first LED, the greater the light intensity of the LED light. Since the first incident surface 26 is a part of the spherical surface with the first LED 41 as the center of sphere, the incident angle of the first part of light $L_{10}$, $L_{11}$, $L_{12}$ of the first LED on the first incident surface 26 is 0 degrees, and the smaller the incident angle of light rays, the greater the energy of light rays incident in the light transmission portion of the end cover. In the first embodiment, the first part of light $L_{10}$, $L_{11}$, $L_{12}$ of the first LED are hardly reflected on the first incident surface 26, but instead enter the light transmission portion entirely. Of course, the incident angle of the first part of light $L_{10}$, $L_{11}$, $L_{12}$ of the first LED on the first incident surface 26 may be slightly greater than 0 degrees, for example, the incident angle of the first part of light $L_{10}$, $L_{11}$, $L_{12}$ of the first LED on the first incident surface 26 may be slightly greater than 0 degrees and less than 10 degrees, which would be beneficial to the flexibility of the arrangement of members inside the end portion of the handle 1, but would not have a significant impact on the brightness at the end cover 2.

After passing through the first incident surface 26, the first part of light $L_{10}$, $L_{11}$, $L_{12}$ travels in the side wall of the end cover 2, and then the first part of light $L_{10}$, $L_{11}$, $L_{12}$ reaches the first reflecting surface 27. The side wall of the end cover 2 is located on one side of the first reflecting surface 27, and the gap 13 shown in FIG. 4 is located on the other side of the first reflecting surface. The substance in the gap 13 is air, that is to say, the first reflecting surface 27 forms an interface between an optically dense substance of a light-transmissive material and an optically rarer substance of the air. By reasonably setting the included angle between the first reflecting surface 27 and the main optical axis $L_{01}$ of the first LED, an incident angle formed by the first part of light $L_{10}$, $L_{11}$, $L_{12}$ and a normal line $L_{02}$ of the first reflecting surface may be greater than the total reflection angle C. For example, the included angle between the first part of light $L_{10}$ of the LED and the main optical axis $L_{01}$ of the first LED is 30 degrees, an incident angle of the first part of light $L_{10}$ of the LED on the first incident surface 26 is 0 degrees, and the total reflection angle of the side wall is 40.43 degrees. Since the range of the included angle is greater than or equal to zero degrees and less than or equal to 90 degrees, when the normal line $L_{02}$ of the first reflecting surface extends on a side of a plane perpendicular to the longitudinal axis $L_S$ that is close to the first LED 41, it is only necessary that the included angle between the normal line $L_{02}$ of the first reflecting surface 27 and the main optical axis $L_{01}$ of the first LED is greater than 70.43 degrees (which is equal to the total reflection angle C plus the included angle between the first part of light $L_{10}$ of the LED and the main optical axis $L_{01}$ of the first LED, in which case the incident angle is just 40.43 degrees), and when the normal line $L_{02}$ of the first reflecting surface extends on a side of the plane perpendicular to the longitudinal axis $L_S$ that is away from the first LED 41, it is only necessary that the included angle between the normal line $L_{02}$ of the first reflecting surface 27 and the main optical axis $L_{01}$ of the first LED is greater than 60 degrees (which is equal to 90 degrees minus the included angle between the first part of light $L_{10}$ of the LED and the main optical axis $L_{01}$ of the first LED, in which case the incident angle is close to 90 degrees). In one embodiments, the first part of light $L_{10}$ is totally reflected on the first reflecting surface 27, and the energy of light rays is completely transmitted in the side wall without leaking to the outside.

Similarly, by reasonably setting an included angle between an auxiliary reflecting surface normal line $L_{03}$ of the auxiliary reflecting surface 30 located on an inner radial side of the side wall and the main optical axis $L_{01}$ of the first LED, the second part of light $L_{20}$, $L_{21}$, $L_{22}$ of the first LED is totally reflected in the side wall on the auxiliary reflecting surface 30, and the auxiliary reflecting surface 30 also forms an interface between an optically dense substance and an optically rarer substance.

Similarly, by reasonably setting an included angle between the normal line $L_{03}$ of the auxiliary reflecting surface and the light emission portion 20 of the rear cover, the incident angle of a third part of light $L_{30}$, $L_{31}$, $L_{32}$ of the first LED on the peripheral portion 20 of the end cover 2 serving as the light emission portion may be substantially less than the total reflection angle, causing the third part of light $L_{30}$ of the first LED to be refracted, at the peripheral portion 20, to the outside air.

The central portion 23 of the end cover 2 is a non-light-transmissive or weak light-transmissive component. It is preferable that the light guide surfaces 22, 24 formed at the junction of the central portion 23 and the peripheral portion 20 are high-gloss surfaces to enhance the reflection effect. The light guide surfaces 22, 24 in the end wall surface each taper upward along the longitudinal axis $L_S$. The central portion 23 of the end wall is not an optically rarer substance relative to the peripheral portion 20, the light rays in the peripheral portion 20 are no longer totally reflected on the light guide surfaces 22, 24 of the second portion of the rear cover, and the central portion 23 of the end wall is a non-transparent body, and almost all the light rays are reflected on the light guide surfaces 22, 24 and reflected to the light emission portion 20 on a side surface of the rear cover, to reduce the loss of energy of the light rays.

Next, referring to FIG. 6, a light transmission path with the second incident surface 28 as a light ray entrance is described.

As shown in FIG. 6, the second incident surface 28 on the end cover 2 is located on a radial side of the fourth LED 44 and on two sides of the longitudinal axis $L_S$, and the main optical axis $L_{03}$ of the fourth LED 44 is substantially perpendicular to the longitudinal axis $L_S$, that is, light is emitted in a radial direction. The fourth LED 44 emits a first part of light $L_{13}$, $L_{14}$, $L_{15}$, $L_{16}$ of the fourth LED, an included angle between the first part of light $L_{13}$, $L_{14}$, $L_{15}$, $L_{16}$ of the fourth LED and the main optical axis $L_{03}$ of the fourth LED is less than 60 degrees and greater than or equal to 0 degrees, and an included angle between the first part of light $L_{13}$ of the fourth LED and the main optical axis $L_{03}$ of the fourth LED is substantially equal to 0 degrees. In one embodiment, the included angle between first part of light $L_{13}$, $L_{14}$, $L_{15}$, $L_{16}$ of the fourth LED 44 and the main optical axis $L_{03}$ of the fourth LED 44 is less than 45 degrees and greater than or equal to 0 degrees. In this way, as the light rays from the LED are closer to the main optical axis $L_{03}$ of the fourth LED, the intensity of the light received by the second incident surface 29 is greater.

Since at least a portion of the second incident surface 28 is a part of a spherical surface with the fourth LED 44 as the center of sphere, the incident angle of the first part of light $L_{13}$, $L_{14}$, $L_{15}$, $L_{16}$ of the fourth LED 44 on the portion of the second incident surface 28 is 0 degrees, and the side of the second incident surface 28 close to the LED 44 is adjacent to air, and the side of the second incident surface 28 away from the LED 44 is adjacent to the light-transmissive material such as MABS of the end cover 2, and the first part of light $L_{13}$, $L_{14}$, $L_{15}$, $L_{16}$ of the fourth LED 44 is hardly reflected on the second incident surface 28, but instead enter the first portion 21 of the rear cover entirely. Of course, the incident angle of the first part of light $L_{13}$, $L_{14}$, $L_{15}$, $L_{16}$ of the fourth LED 44 on the second incident surface 28 may be slightly greater than 0 degrees, for example, the incident angle of the first part of light $L_{13}$, $L_{14}$, $L_{15}$, $L_{16}$ of the fourth LED 44 on the second incident surface 28 may be slightly greater than 0 degrees and less than 10 degrees, which is also feasible.

After passing through the second incident surface 28, the first part of light $L_{13}$, $L_{14}$, $L_{15}$, $L_{16}$ of the fourth LED 44 travels in the side wall of the end cover 2, and the first part of light $L_{13}$, $L_{14}$, $L_{15}$, $L_{16}$ of the fourth LED 44 reaches the second reflecting surface 29. Since the second reflecting surface 29 is adjacent to the side wall of the end cover 2 on an inner radial side, and adjacent to the gap 14 on an outer radial side, and the substance in the gap 14 is air, the second reflecting surface 29 forms an interface between an optically dense substance and an optically rarer substance. By reasonably setting the included angle between the second reflecting surface 29 and the main optical axis $L_{03}$ of the fourth LED 44, the incident angle formed by the first part of light $L_{13}$, $L_{14}$, $L_{15}$, $L_{16}$ of the fourth LED 44 and a normal line $L_{03}$ of the second reflecting surface may be greater than the total reflection angle C of the interface. For example, when the included angle between the first part of light $L_{14}$ of the fourth LED 44 and the main optical axis $L_{03}$ of the fourth LED is 5 degrees, the incident angle of the first part of light $L_{14}$ of the fourth LED 44 on the second incident surface 28 is 0 degrees, and the total reflection angle of the side wall of the end cover 2 is 40.43 degrees, it is only necessary that the included angle between the normal line of the second reflecting surface 29 and the main optical axis $L_{03}$ of the fourth LED 44 is greater than 35.43 degrees (which is equal to the total reflection angle C minus the included angle between the first part of light $L_{14}$ of the fourth LED 44 and the main optical axis $L_{03}$ of the fourth LED), and the second reflecting surface 29 tapers upward along the longitudinal axis $L_S$. The first part of light $L_{14}$ of the LED is totally reflected on the second reflecting surface 29, and the energy of the light rays is transmitted in the transmission portion of the side wall of the end cover 2 without leaking to the outside.

Similarly, by reasonably setting the included angle between the normal line Loo of the second reflecting surface 29 and the light emission portion 20 at the bottom of the rear cover, the incident angle of the second part of light of the fourth LED on the light emission portion 20 at the bottom of the rear cover may be less than the total reflection angle, causing the second part of light of the fourth LED to be refracted, at the peripheral portion 20 of the end cover 2, to the outside air.

By reasonably setting the included angle between the normal line $L_{06}$ of the second reflecting surface 29 and the normal line $L_{04}$ of the light guide surface 24 of the end wall, the second part of light $L_{23}$, $L_{24}$, $L_{25}$ of the fourth LED may be refracted to the outside air from the peripheral portion 20 of the side surface of the rear cover serving as the light emission portion by means of the reflection of the light guide surface 24. The central portion 23 of the end wall is a non-light-transmissive or weak light-transmissive component, for example, made of a transparent material MABS added with white masterbatch by injection molding. In one embodiment, the light guide surfaces 22, 24 are high-gloss surfaces, to enhance the reflection effect. As shown in FIG. 6, the light guide surfaces 22, 24 in the end wall taper upward along the longitudinal axis $L_S$ of the rear cover. Although the central portion 23 of the end wall is not an optically rarer substance relative to the peripheral portion 20 of the end wall, and light rays in the first portion 21 of the rear cover can no longer be totally reflected on the light guide surfaces 22, 24, almost all the light rays transmitted from the side wall are reflected on the light guide surfaces 22, 24, and reflected to the light emission portion on the side surface of the end wall because the central portion 23 of the end wall is a non-light-transmissive or weak light-transmissive body, to reduce the loss of energy of the light rays.

In other embodiments, the second reflecting surface 29, the first reflecting surface 27, and the auxiliary reflecting surface 30 are entirely or partially covered by non-light-transmissive components or coatings, the non-light-transmissive components or coatings partially or entirely replace air gaps corresponding to the second reflecting surface 29, the first reflecting surface 27, and the auxiliary reflecting surface 30, and the energy of light rays can also be transmitted in the transmission portion of the side wall of the end cover 2 without leaking to the outside.

In one embodiment, the end cover 2 may be manufactured by injection molding. In one embodiment, the end cover 2 is divided into two portions, the side wall and the peripheral portion 20 of the end wall of the end cover 2 serve as the first portion and are made of a light-transmissive material by injection molding, and the central portion 23 of the end wall of the end cover 2 serves as the second portion and is made of a non-light-transmissive material by injection molding. The first portion of a non-light-transmissive material is first injection molded, and then the second portion is injection molded with a transparent material and the second portion is integrated with the first portion in a water-tight manner.

In other embodiments, the injection molding order of the first portion and the second portion may be interchanged.

The materials of the first portion 21 and the second portion may include MABS, ABS, PMMA, PC, etc. The materials of the first portion and the second portion may be the same or different. The first portion 21 of the end cover is made of a colorless transparent material or a light-transmissive colored material by injection molding. The central portion serving as the second portion is made of a non-light-transmissive material by injection molding, and a reflective material may be added to the material. For example, the second portion may be made of a transparent material MABS added with white masterbatch by injection molding.

Figure 7:
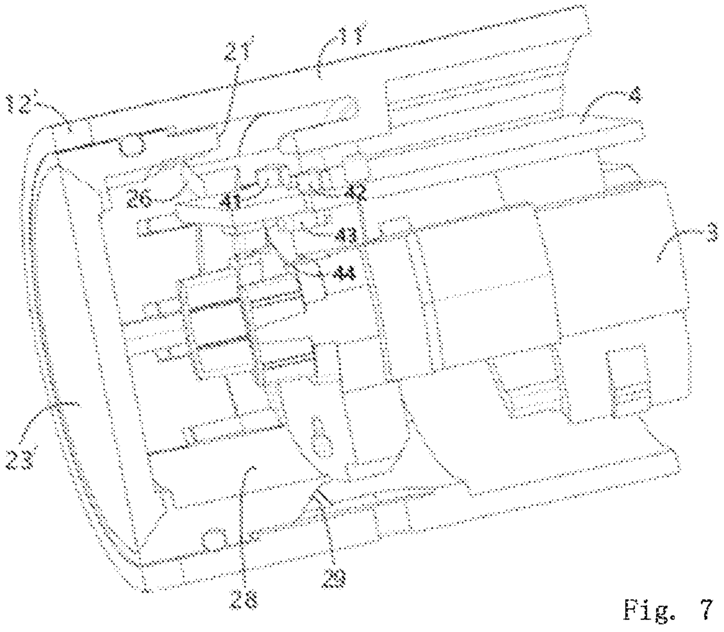
FIG. 7 shows a schematic diagram of an internal structure of an end portion of an electric toothbrush according to one embodiment of the present disclosure, which is taken along a longitudinal axis.

FIG. 7 shows the internal structure of an end light-emitting device of an electric toothbrush according to one embodiment of the present disclosure. Different from the first embodiment, in the second embodiment, an outer peripheral surface of an end wall of an end cover 2' is also surrounded in the housing 11', and a peripheral portion 20 of the end wall is also accommodated in an opening 15. In this case, a tail end of the housing includes at least a light-transmissive portion 12', the position of which corresponds to the peripheral portion 20 of the end wall, to allow the light rays refracted from an outer peripheral surface of the peripheral portion 20 to be emitted to the outside through the light-transmissive portion 12'.

FIG. 8 shows the internal structure of an end light-emitting device of an electric toothbrush according to a third embodiment of the present disclosure. In the third embodiment, the entire end cover 2" is made of a light-transmissive material, that is to say, a side wall and an end wall of the end cover integrally form a first portion 21", which is made of a light-transmissive material in one piece. In this case, the end wall of the end cover no longer has a light guide surface.

As shown in FIG. 8, the electric toothbrush has a charging coil bobbin 5" in the housing 11" and adjacent to a central portion of the end wall, and an outer peripheral surface 51" of a flange of the charging coil bobbin 5" adjacent to the end wall of arranged obliquely relative to a longitudinal axis to serve as a reflecting surface, to guide the light rays to be emitted from a light emission portion 20 of the transparent end cover. In one embodiment, a tail portion of the housing 11" of a handle is further provided with a light-transmissive portion 12', and light rays may also be emitted from this light-transmissive portion.

According to the light-emitting device of the present disclosure, an annular light-emitting display may be formed at a tail end of a handle 1 of an electric toothbrush, the efficient transmission of light rays can be realized by means of the structure of the end cover itself, and the structure of the end cover can allow the light rays to avoid the sealing ring made of rubber having no or weak light-transmissive ability and lead the light rays out from an end portion of a circuit board, to provide a novel way of light indication. In addition, the structure of the light-emitting device would not increase the installation complexity of the handle 1 and the water tightness.

What is claimed is:

1. An electric toothbrush, comprising:

a housing and an end cover, with an opening being formed at an end portion of said housing in a longitudinal axis, said end cover is fitted into the opening, said end cover having an end wall and a side wall, said end wall being substantially perpendicular to said longitudinal axis, said the side wall extending from the end wall and being inserted into said opening along a direction of said longitudinal axis, said end wall and said side wall are integrally formed, wherein said electric toothbrush further comprises an end cover light-emitting device, which comprises:

a light source arranged on a circuit board inside said housing close to said end cover; and a light transmission portion including at least a part of said side wall and at least a part of a peripheral portion, wherein a light incident portion of said light transmission portion is located at at least a part of said side wall, a light emission portion of said light transmission portion is located at at least a part of the peripheral portion of the side wall, and said light transmission portion is made of a first material that is light-transmissive, wherein said side wall includes a reflecting surface for transmitting light rays to the light emission portion, and an angle of said reflecting surface relative to incident light rays is set to reflect said light source toward said light emission portion, wherein each of the reflecting surface forms an interface between an optically dense substance and an optically rarer substance, said optically dense substance is said first material forming said light transmission portion, and said reflecting surface is configured relative to light rays from said light source and an incident angle of the light rays emitted by said light source relative to the reflecting surface is greater than a total reflection angle of said reflecting surface, a gap is formed between said reflecting surface and an inner surface of a segment of the housing surrounding the reflecting surface, and said optically rarer substance includes air filled in the gap, and wherein a groove is formed in an outer surface of said side wall of said end cover, and a sealing ring is accommodated in said groove.

2. The electric toothbrush according to claim 1, wherein said light source includes an LED light source.

3. The electric toothbrush according to claim 2, wherein said light source includes a first LED light source and a second LED light source, and said first LED light source and said second LED light source are respectively installed on two opposite surfaces of said circuit board.

4. The electric toothbrush according to claim 1, wherein said end wall further includes a central portion surrounded by said peripheral portion, and said central portion is made of a second material that is non-light transmissive, wherein a light guide surface is formed between the central portion and the peripheral portion of the end wall, and said light guide surface is inclined relative to the longitudinal axis.

5. The electric toothbrush according to claim 1, wherein said light incident portion further includes: an incident surface located at an end surface of said side wall and/or an incident surface located at an inner peripheral surface of said side wall, wherein said LED light source is arranged relative to said incident surface so that an incident angle of light rays emitted from said LED light source on the incident surface is between 0 and 10 degrees, and said incident surface includes a spherical surface with the LED light source as the center of sphere.

6. The electric toothbrush according to claim 1, wherein said side wall includes a reflecting surface for transmitting light rays to the light emission portion, wherein at least a part of the reflecting surface is covered with a non-light-transmissive material.

7. The electric toothbrush according to claim 1, wherein said peripheral portion of said end cover is inserted into said opening and surrounded by said housing, and said housing includes a light-transmissive portion surrounding said peripheral portion.

8. The electric toothbrush according to claim 1, wherein said end cover is integrally formed from said the first material, and said electric toothbrush further includes a coil bobbin located in said housing and adjacent to said end wall, and a flange of the coil bobbin adjacent to said end wall includes a reflecting surface.

* * * * *